United States Patent
Dasgupta et al.

(10) Patent No.: US 7,080,168 B2
(45) Date of Patent: Jul. 18, 2006

(54) MAINTAINING AGGREGATE DATA COUNTS FOR FLOW CONTROLLABLE QUEUES

(75) Inventors: Subhajit Dasgupta, San Jose, CA (US); Jaisimha Bannur, Sunnyvale, CA (US); Anujan Varma, Santa Cruz, CA (US)

(73) Assignee: Intel Corporation, Santa Clara, CA (US)

( * ) Notice: Subject to any disclaimer, the term of this patent is extended or adjusted under 35 U.S.C. 154(b) by 152 days.

(21) Appl. No.: 10/622,285

(22) Filed: Jul. 18, 2003

(65) Prior Publication Data

US 2005/0015388 A1 Jan. 20, 2005

(51) Int. Cl.
*G06F 3/00* (2006.01)

(52) U.S. Cl. .............. 710/29; 710/34; 710/52; 709/234; 370/235

(58) Field of Classification Search ........... 710/29, 710/34, 52, 53; 709/223, 234
See application file for complete search history.

(56) References Cited

U.S. PATENT DOCUMENTS

| | | | |
|---|---|---|---|
| 4,092,732 A | 5/1978 | Ouchi | |
| 4,331,956 A | 5/1982 | Anderson | |
| 4,335,458 A | 6/1982 | Krol | |
| 4,695,999 A | 9/1987 | Lebizay | |
| 5,127,000 A | 6/1992 | Henrion | |
| 5,191,578 A | 3/1993 | Lee | |
| 5,260,935 A | 11/1993 | Turner | |
| 5,274,785 A | 12/1993 | Kuddes | |
| 5,442,752 A | 8/1995 | Styczinski | |
| 5,483,523 A | 1/1996 | Nederlof | |
| 5,649,157 A | 7/1997 | Williams | |
| 5,682,493 A | 10/1997 | Yung | |
| 5,832,278 A | 11/1998 | Pham | |
| 5,848,434 A | 12/1998 | Young | |
| 5,859,835 A | 1/1999 | Varma | |
| 5,860,097 A | 1/1999 | Johnson | |
| 5,978,951 A | 11/1999 | Lawler | |
| 6,055,625 A | 4/2000 | Nakada | |
| 6,061,345 A | 5/2000 | Hahn | |
| 6,147,969 A * | 11/2000 | Benmohamed et al. ..... 370/230 |
| 6,167,508 A | 12/2000 | Farrell | |
| 6,170,032 B1 | 1/2001 | Izzard | |
| 6,188,698 B1 | 2/2001 | Galand | |
| 6,282,686 B1 | 8/2001 | Cypher | |
| 6,321,306 B1 | 11/2001 | Arimilli | |
| 6,359,891 B1 | 3/2002 | Bergantino | |
| 6,408,378 B1 | 6/2002 | O'Connor | |
| 2002/0126683 A1* | 9/2002 | Ahlfors et al. .............. 370/412 |
| 2003/0016686 A1* | 1/2003 | Wynne et al. .............. 370/412 |
| 2003/0112817 A1* | 6/2003 | Woo et al. .................. 370/413 |
| 2003/0128703 A1* | 7/2003 | Zhao et al. ................. 370/392 |
| 2003/0152082 A9* | 8/2003 | Van Wageningen et al. ..... 370/395.4 |
| 2003/0200330 A1* | 10/2003 | Oelke et al. ................ 709/238 |

\* cited by examiner

*Primary Examiner*—Kim Huynh
*Assistant Examiner*—Eron J. Sorrell
(74) *Attorney, Agent, or Firm*—Douglas J. Ryder; Ryder IP Law, PC (57) ABSTRACT

In general, in one aspect, the disclosure describes an apparatus that includes a plurality of flow controllable queues containing data to be transmitted. The queues are organized by flow. The apparatus also includes a plurality of destinations to receive data from the plurality of queues. The apparatus further includes a controller to continually maintain an aggregate count of data ready for transmission to the destinations and determine next queue to transmit data from based at least partially on the aggregate counts.

34 Claims, 10 Drawing Sheets

MAINTAINING AGGREGATE DATA COUNTS FOR FLOW CONTROLLABLE QUEUES

BACKGROUND

In communication networks today, there is a need to build store-and-forward switches and routers that have line cards with high speeds. The line cards queue incoming traffic into memory, and subsequently dequeue the data from memory, as a prelude to its being sent to its destination. Each queue is associated with a flow (transfer of data from source to destination under certain parameters). The flow of data may be accomplished using any number of protocols including Asynchronous Transfer Mode (ATM), Internet Protocol (IP), and Transmission Control Protocol/IP (TCP/IP). The flows may be based on parameters such as the destination port of the packet, its source port, class of service, the protocol associated with the data. Therefore, a line card may maintain a large number of queues (e.g., one per flow).

The scheduling associated with the dequeuing of data can be done using a two-level hierarchical scheduler. In such a scheduler, a first level scheduler (a port-level scheduler) determines which of several eligible destination ports should be chosen to receive data from a given source port. A second lower-level scheduler (a queue level scheduler) chooses the individual queues that contain data for that destination port for dequeuing. The port-level scheduler often bases the decision of which destination port to transmit data to based on an aggregate count of data (e.g., bytes, words, packets) stored in the queues destined for each destination port. For example, when two line cards are attempting to send packets to the same destination port, the scheduler may give priority to the one that has larger amount of data (in aggregate) to send.

In order to generate the aggregate count the scheduler requests data counts for each queue associated with a destination every so often (e.g., every few clock cycles). As the requests are processed with other transactions, it may take several clock cycles before the count from each queue is received and the aggregate count can be generated. As data may be queued and dequeued each clock cycle, there is potential that the aggregate count is outdated as soon as it is received.

A further complicating factor is that some of the queues may be flow-controlled (flow control status OFF) and therefore not eligible to send data to the destination port. The data queued in such queues should not be included in the per-port counts used by the port-level scheduler. Therefore, the per queue counts of flow-controlled queues destined for each port should be excluded from the aggregate per-port count for the corresponding port. Additionally, when a queue transitions from an OFF (flow-controlled) state to an ON state and vice versa, the corresponding per-port counts need to be updated to include and exclude the queues respectively. Note that the queue for which the flow control state changes may be distinct from the queue for which data is being enqueued or dequeued, or it may be the same as one or both of these queues.

Using count requests to determine the aggregate count does not produce a real (or near real) time result and can thus provide outdated results that negatively effect the selection of the next queue.

BRIEF DESCRIPTION OF THE DRAWINGS

The features and advantages of various embodiments will become apparent from the following detailed description in which.

DETAILED DESCRIPTION

Figure 1A:
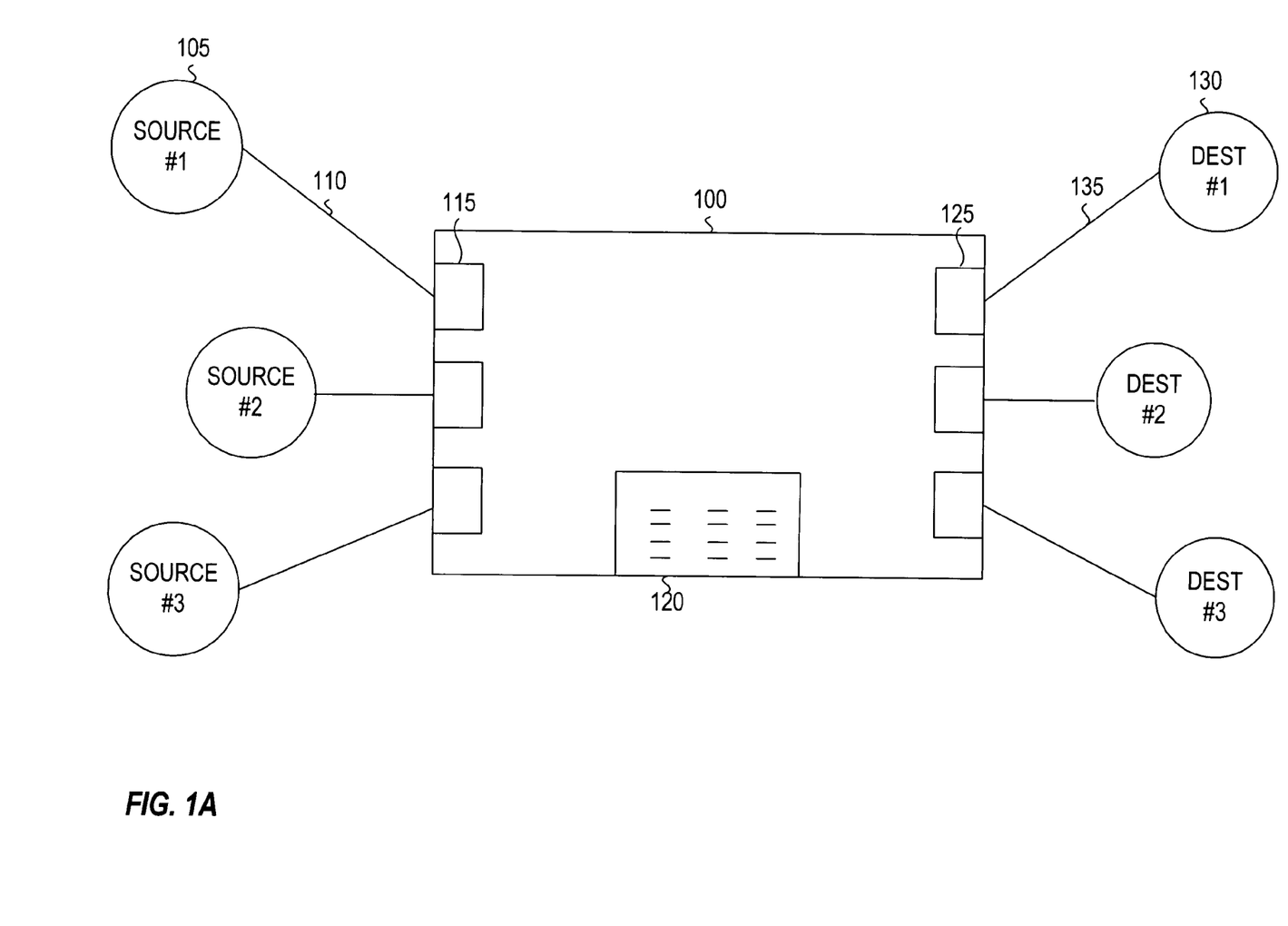
FIG. 1A illustrates an exemplary block diagram of a store-and-forward device, according to one embodiment.

FIG. 1A illustrates an exemplary block diagram of a store-and-forward device 100 that receives data from multiple sources 105 (e.g., computers, other store and forward devices) over multiple communication links 110 (e.g., twisted wire pair, fiber optic, wireless). The sources 105 may be capable of transmitting data having different attributes (e.g., different speeds, different quality of service) over different communication links 110. For example, the system may transmit the data using any number of protocols including, but not limited to, Asynchronous Transfer Mode (ATM), Internet Protocol (IP), and Time Division Multiplexing (TDM). The data may be sent in variable length or fixed length packets, such as cells or frames.

The store and forward device 100 has a plurality of receivers (ingress modules) 115 for receiving the data from the various sources 105 over the different communications links 110. Different receivers 115 will be equipped to receive data having different attributes (e.g., speed, protocol). The data is stored in a plurality of queues 120 until it is ready to be transmitted. The queues 120 may be stored in any type of storage device and preferably are a hardware storage device such as semiconductor memory, on chip memory, off chip memory, field-programmable gate arrays (FPGAs), random access memory (RAM), or a set of registers. The store and forward device 100 further includes a plurality of transmitters (egress modules) 125 for transmitting the data to a plurality of destinations 130 over a plurality of communication links 135. As with the receivers 115, different transmitters 125 will be equipped to transmit data having different attributes (e.g., speed, protocol). The receivers 115 are connected through a backplane (not shown) to the transmitters 125. The backplane may be electrical or optical. A single receiver 115, a single transmitter 125, multiple receivers 115, multiple transmitters 125, or a combination of receivers 115 and transmitters 125 may be contained on a single line card. The line cards may be Ethernet (e.g., Gigabit, 10 Base T), ATM, Fibre channel, Synchronous Optical Network (SONET), Synchronous Digital Hierarchy (SDH), various other types of cards, or some combination thereof.

Figure 1B:
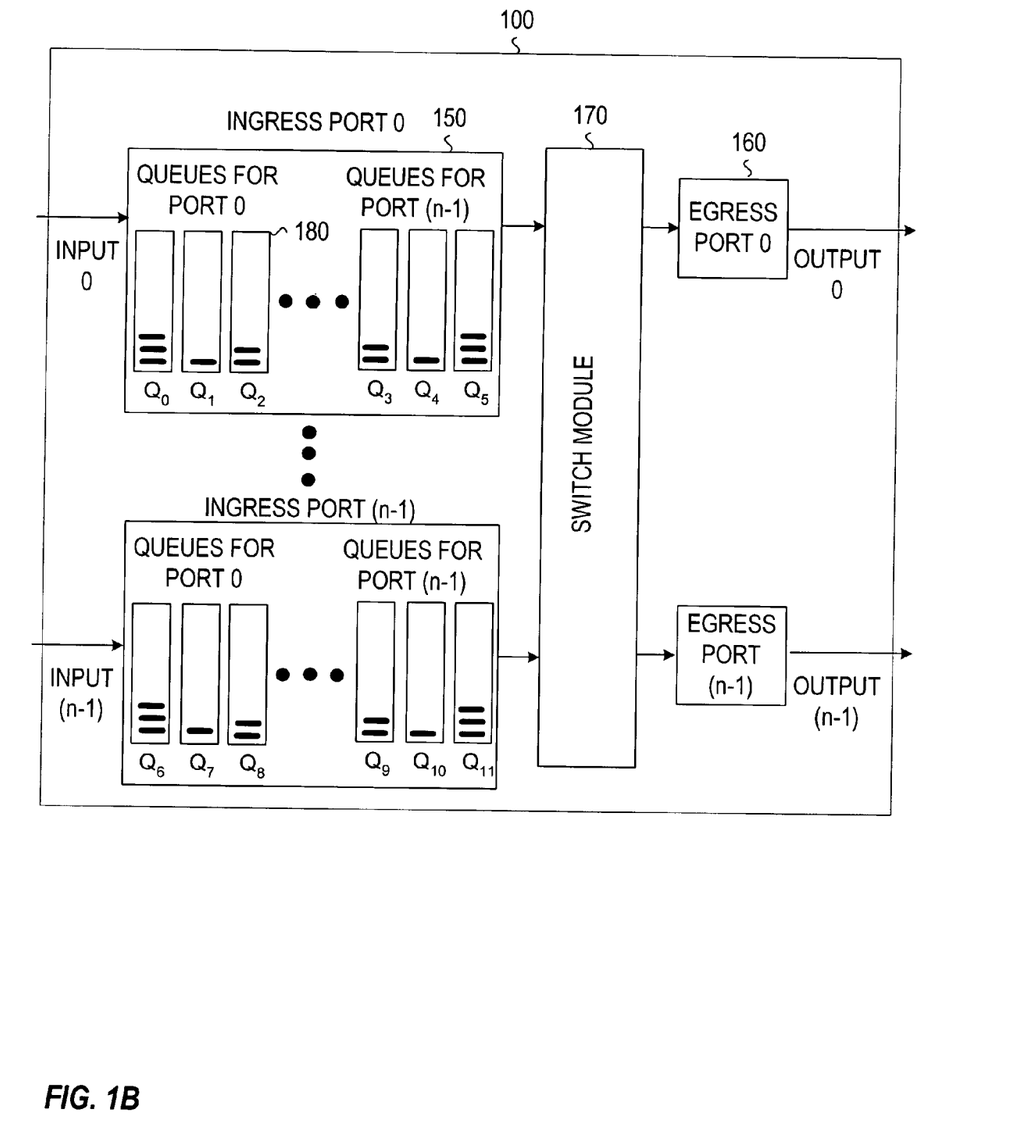
FIG. 1B illustrates an exemplary detailed block diagram of a store-and-forward device, according to one embodiment.

FIG. 1B illustrates an exemplary detailed block diagram of the store and-and-forward device 100. The store-and-forward device has multiple ingress ports 150, multiple egress ports 160 and a switch module 170 controlling transmission of data from the ingress ports 150 to the egress ports 160. Each ingress port 150 may have one or more queues 180 (for holding data prior to transmission) for each of the egress ports 160 based on the flows associated with the queues 180. The data is separated into flows based on numerous factors including, but not limited to, size, period of time in queue, priority, quality of service, protocol, and source and destination of data. As illustrated, each ingress port 150 has three queues for each egress port 160 indicating that there are three distinct flows.

The order in which the queues 180 are processed is based at least in part on the various flows. Referring back to FIG. 1B, the three ingress port 0 queues associated with egress port 0 are illustrated as queues Q0–Q2, the three ingress port 0 queues associated with egress port n−1 are Q3–Q5, the three ingress port n−1 queues associated with egress port 0 are illustrated as queues Q6–Q8, and the three ingress port n−1 queues associated with egress port n−1 are illustrated as queues Q9–Q11. For illustrative purposes consider that the queues have the following data counts: Q0=9, Q1=1, Q2=1, Q3=7, Q4=8, Q5=1, Q6=9, Q7=3, Q8=2, Q9=7, Q10=5, and Q11=6.

According to one embodiment, an aggregate data count is determined for the egress ports. The data count for an egress port includes data within the queues associated with the egress port. The egress port having the highest data count is selected. The queue, associated with the selected egress port, having the highest data count is then selected. In this example, the aggregate count for egress port 0 includes Q0–Q2 and Q6–8 (25), and
egress port n−1 includes Q3–5 and Q9–11 (34)

Egress port n−1 is selected as it has the highest data count (34). Q4 is selected because it is the queue associated with egress port n−1 that has the highest data count (8).

According to one embodiment, an aggregate data count is determined for the egress ports per ingress port and in total. The egress port having the highest data count is selected. The ingress port, associated with the selected egress port, having the highest data count is selected. The queue, associated with the selected ingress port, having the highest data count is then selected. In the above example, the aggregate count for ingress port 0, egress port 0 includes Q0–2 (11),
ingress port 0, egress port n−1 includes Q3–5 (16),
ingress port n−1, egress port 0 includes Q6–8 (14),
ingress port n−1, egress port n−1 includes Q9–11 (18),
total egress port 0 includes Q0–2 and Q6–8 (25), and
total egress port n−1 includes Q3–5 and Q9–11 (34)

Egress port n−1 is selected as it has the highest data count (34). Ingress port n−1 is selected because it is the ingress port associated with egress port n−1 that has the highest data count (18). Q9 is selected as it is the queue associated with ingress port n−1 (and egress port n−1) with the highest data count (7).

According to one embodiment, an aggregate data count is determined for the egress ports per ingress port. For each ingress port, the egress port selected is the egress port having the highest data count. The queue selected for each ingress port is the queue, associated with the selected egress port, having the highest data count. In the above example, the aggregate count for ingress port 0 is egress port 0 includes Q0–2 (11), and
egress port n−1 includes Q3–5 (16)

Egress port n−1 is selected as it has the highest data count (16). Q4 is selected as it is the queue associated with egress port n−1 (and ingress port 0) that has the highest data count (8).

In the above example, the aggregate count ingress port n−1 is egress port 0 includes Q6–8 (14), and
egress port n−1 includes Q9–11 (18)

Egress port n−1 is selected as it has the highest data count (18). Q9 is selected as it is the queue associated with egress port n−1 (and ingress port n−1) that has the highest data count (7).

According to one embodiment, an aggregate data count is determined for the ingress ports per egress port. For each egress port, the ingress port selected is the ingress port having the highest data count. The queue selected for each ingress port, is the queue having the highest data count. In the above example, the aggregate count for egress port 0 is ingress port 0 includes Q0–2 (11), and
ingress port n−1 includes Q6–8 (14)

Ingress port n−1 is selected as it has the highest data count (14). Q6 is selected as it is the queue associated with ingress port n−1 (and egress port 0) that has the highest data count (9).

In the above example, the aggregate count for egress port n−1 is ingress port 0 includes Q3–5 (16), and
ingress port n−1 includes Q9–11 (18)

Ingress port n−1 is selected as it has the highest data count (18). Q9 is selected as it is the queue associated with ingress port n−1 (and egress port n−1) having the highest data count (7).

When data (e.g., a packet) is received at an ingress port its destination (egress port) and flow are determined, and the data is stored (queued) in an associated queue. When data is queued, the per-port count of the corresponding destination port (egress module) is increased by the amount of data queued. When data is transmitted from the ingress module to the egress module, the data is removed (dequeued) from the associated queue. When data is dequeued, the per-port count of the corresponding destination port (egress module) is decreased by the amount of data dequeued. When the flow control for a particular queue associated with a particular egress module changes from OFF (preventing data flow) to ON (permitting data flow), the per-port count of the corresponding destination port (egress module) is increased to include the data in the queue. When the flow control for a particular queue associated with a particular egress module changes from ON (permitting data flow) to OFF (preventing data flow), the per-port count of the corresponding destination port (egress module) is decreased to exclude the data in the queue.

During each clock cycle, one or more of the above noted events may occur in the store-and-forward device as the events are not independent of one another. It is possible that multiple events (e.g., two or three of the events described above) may be performed on the same queue (have same queue ID). For example, queue 7 may transmit data (dequeue) as well as receive data (enqueue). In addition, multiple events may affect different queues that are associated with the same egress port. For example, queues 6–8 which correspond to egress port 0 may have the following events occur: queue 6 receives data (queue), queue 7 transmits data (dequeue), and queue 8 turns flow control ON (enables flow). When multiple events occur the queues and per-port counts are updated coherently to account for all associated increments and decrements.

Figure 2:
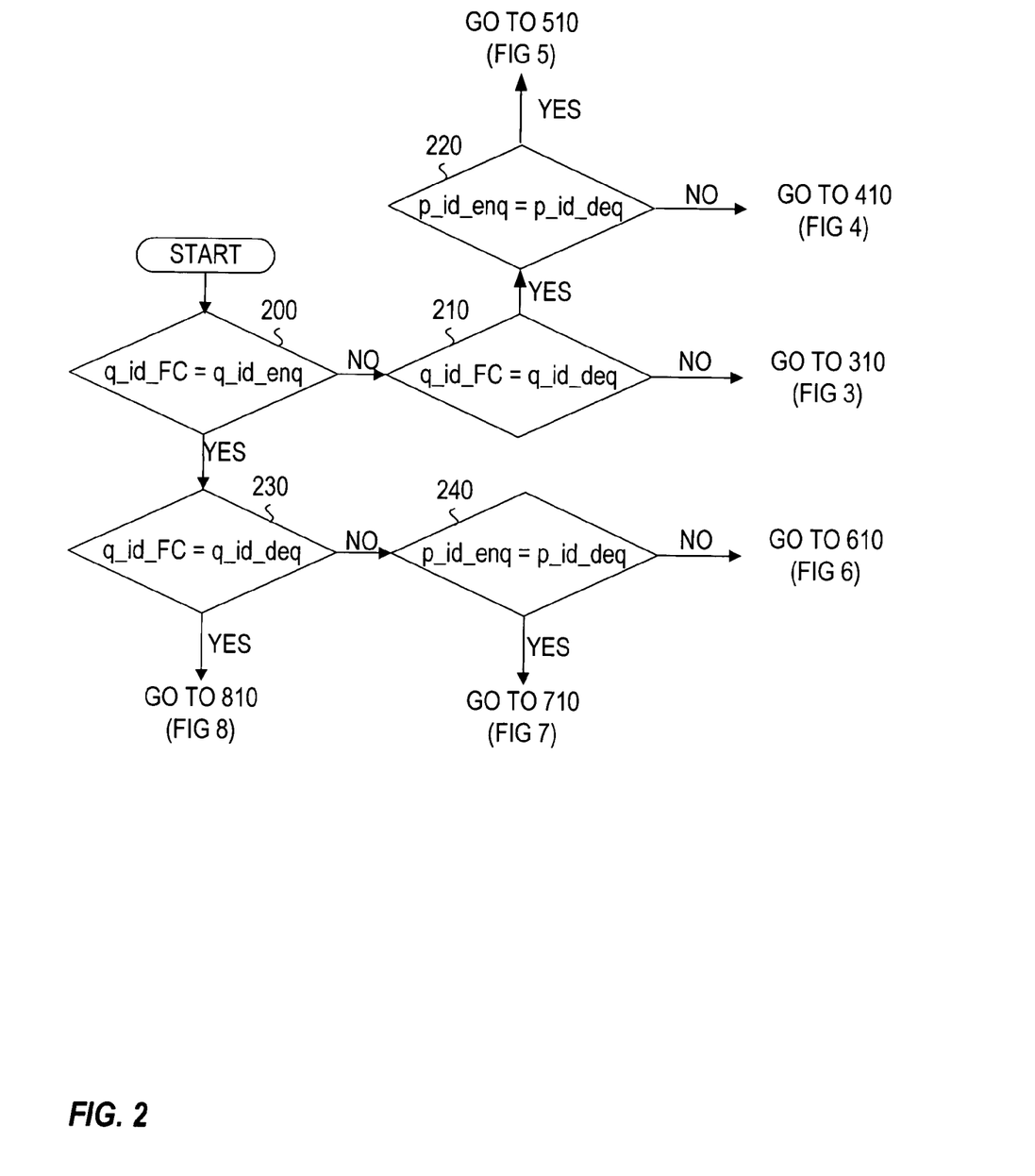
FIG. 2 illustrates an exemplary high-level process flow for determining how to update the associated per-port count and the associated queue count, according to one embodiment.

FIG. 2 illustrates an exemplary high-level process flow for determining how to update the associated per-port count and the associated queue count. This process is invoked when one or more of the three events discussed above (an enqueue event, a dequeue event, or a flow control event) occurs. As discussed, the three events could occur simultaneously in the same clock cycle. Initially, a determination 200 is made as to whether a queue identification (ID) of the queue for which the flow control state has changed (q_id_FC) is the same as queue ID of the queue for which data is being queued (q_id_enq). If the queue IDs are not the same (200 No) for the FC (q_id_FC) and the enqueue (q_id_enq) operations, then a determination 210 is made as to whether the flow control queue ID (q_id_FC) is the same as queue ID of the queue for which data is being dequeued (q_id_deq). If the queue IDs are not the same (210 No) for the FC (q_id_FC) and the dequeue (q_id_deq), then the process proceeds to 310 which is described in more detail in FIG. 3. Referring back to FIG. 1B, if queue Q0 was enqueued and dequeued and queue Q1 had a flow control change, we would proceed to FIG. 3 as the queue ID for the flow control is not the same as the queue ID for either the enqueue or dequeue. In addition, the process would proceed to FIG. 3 if there was no queue having a flow control change, if there was no enqueuing or dequeuing for this particular ingress port, or for multiple other reasons.

If the queue IDs are the same (210 Yes) for the FC (q_id_FC) and the dequeue (q_id_deq), then a determination 220 is made as to whether a port ID of the queue for which data is being enqueued (p_id_enq) is the same as a port ID of the queue for which data is being dequeued (p_id_deq). If the port IDs are not the same (220 No) for the enqueue (p_id_enq) and dequeue (p_id_deq), then the process proceeds to 410 which is described in more detail in FIG. 4. Referring back to FIG. 1B, if queue Q0 was dequeued and had a flow control transition and Q3 was enqueued, we would proceed to FIG. 4 as the queue ID for the flow control and dequeue are the same and the port IDs for the enqueue and dequeue are different.

Figure 5:
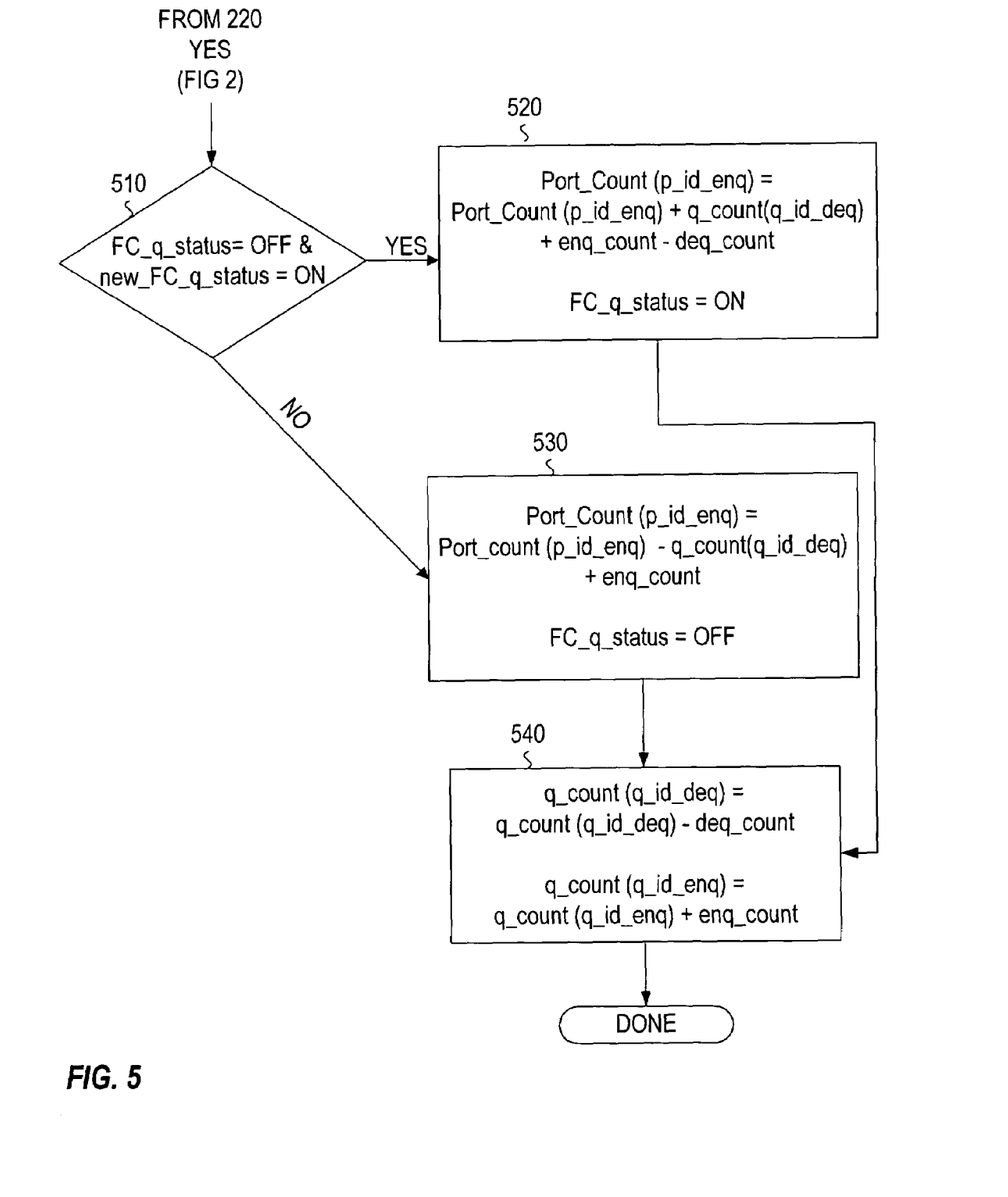
FIG. 5 illustrates an exemplary process flow for updating the associated per-port count and the associated queue count when the queue having a flow control change is the same as the queue being dequeued, and the same port is being queued and dequeued, according to one embodiment.

If the port IDs are the same (220 Yes) for the enqueue (p_id_enq) and dequeue (p_id_deq), then the process proceeds to 510 which is described in more detail in FIG. 5. Referring back to FIG. 1B, if queue Q0 was dequeued and had a flow control transition and Q1 was enqueued, we would proceed to FIG. 5 as the queue ID for the flow control and dequeue are the same and the port IDs for the enqueue and dequeue are the same.

If the queue IDs are the same (200 Yes) for the FC (q_id_FC) and the enqueue (q_id_enq) operations, then a determination 230 is made as to whether the flow control queue ID (q_id_FC) is the same as the dequeue queue ID (q_id_deq). If the queue IDs are not the same (230 No) for the FC (q_id_FC) and the dequeue (q_id_deq), then a determination 240 is made as to whether a port ID being queued (p_id_enq) is the same as a port ID being dequeued (p_id_deq). If the port IDs are not the same (240 No) for the enqueue (p_id_enq) and dequeue (p_id_deq), then the process proceeds to 610 which is described in more detail in FIG. 6. Referring back to FIG. 1B, if queue Q0 was queued and had a flow control transition and Q3 was dequeued, we would proceed to FIG. 6 as the queue ID for the flow control and enqueue are the same and the port IDs for the enqueue and dequeue are different.

Figure 7:
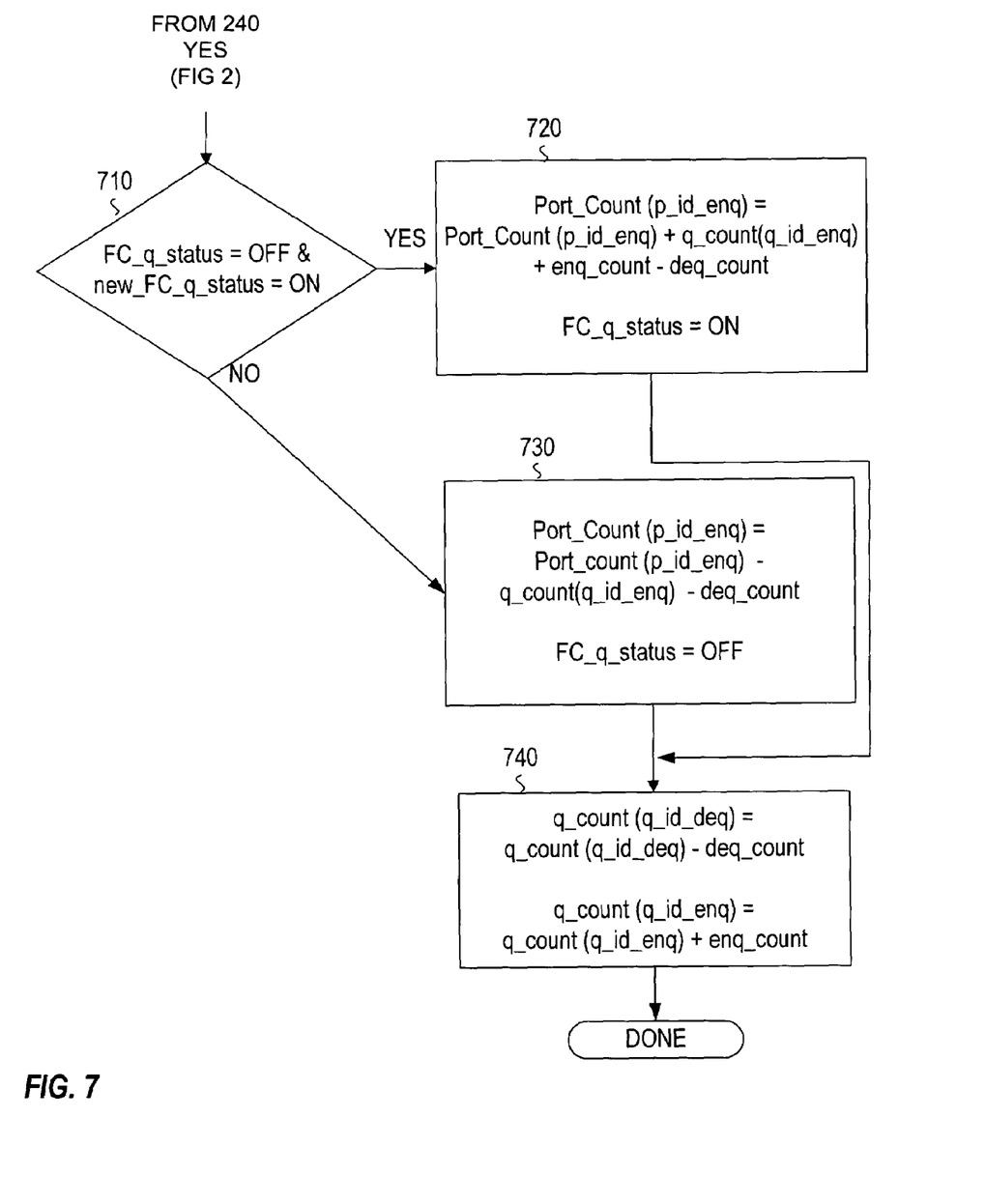
FIG. 7 illustrates an exemplary process flow for updating the associated per-port count and the associated queue count when the queue having a flow control change is the same as the queue being queued, and the same port is being queued and dequeued, according to one embodiment.

If the port IDs are the same (240 Yes) for the enqueue (p_id_enq) and dequeue (p_id_deq), then the process proceeds to 710 which is described in more detail in FIG. 7. Referring back to FIG. 1B, if queue Q0 was enqueued and had a flow control transition and Q1 was dequeued, we would proceed to FIG. 7 as the queue ID for the flow control and enqueue are the same and the port IDs for the enqueue and dequeue are the same.

Figure 8:
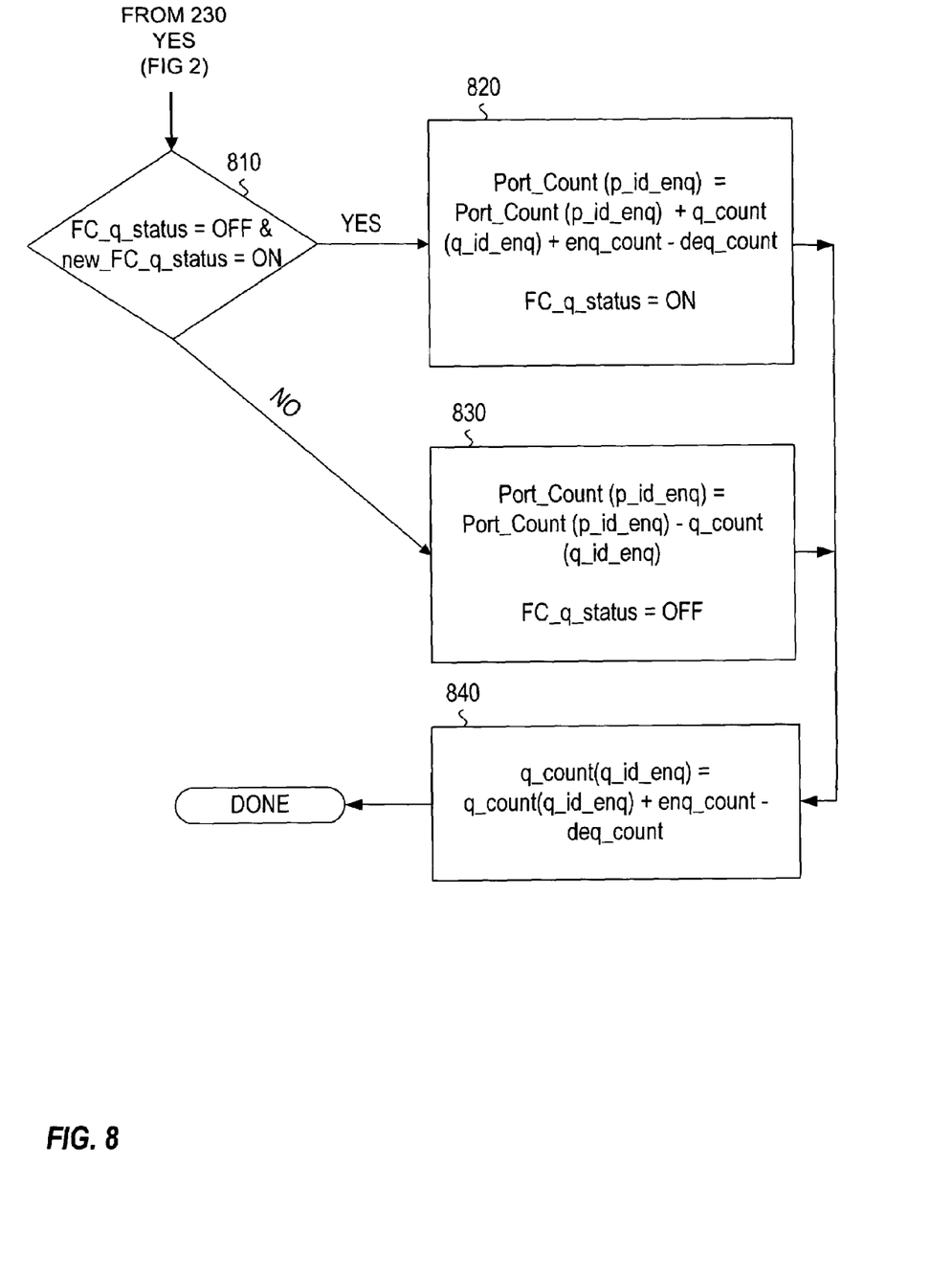
FIG. 8 illustrates an exemplary process flow for updating the associated per-port count and the associated queue count when the queue having a flow control change is the same as the queue being queued and the queue being dequeued, according to one embodiment.

If the queue IDs are the same (230 Yes) for the FC (q_id_FC) and the dequeue (q_id_deq), then the process proceeds to 810 which is described in more detail in FIG. 8. Referring back to FIG. 1B, if queue Q0 was enqueued, dequeued and had a flow control transition, we would proceed to FIG. 8 as the queue IDs are the same.

The process defined above with respect to FIG. 2 is in no way limited thereto. Rather, the process could be modified in numerous ways (e.g., order, arrangement) without departing from the scope.

Figure 3A:
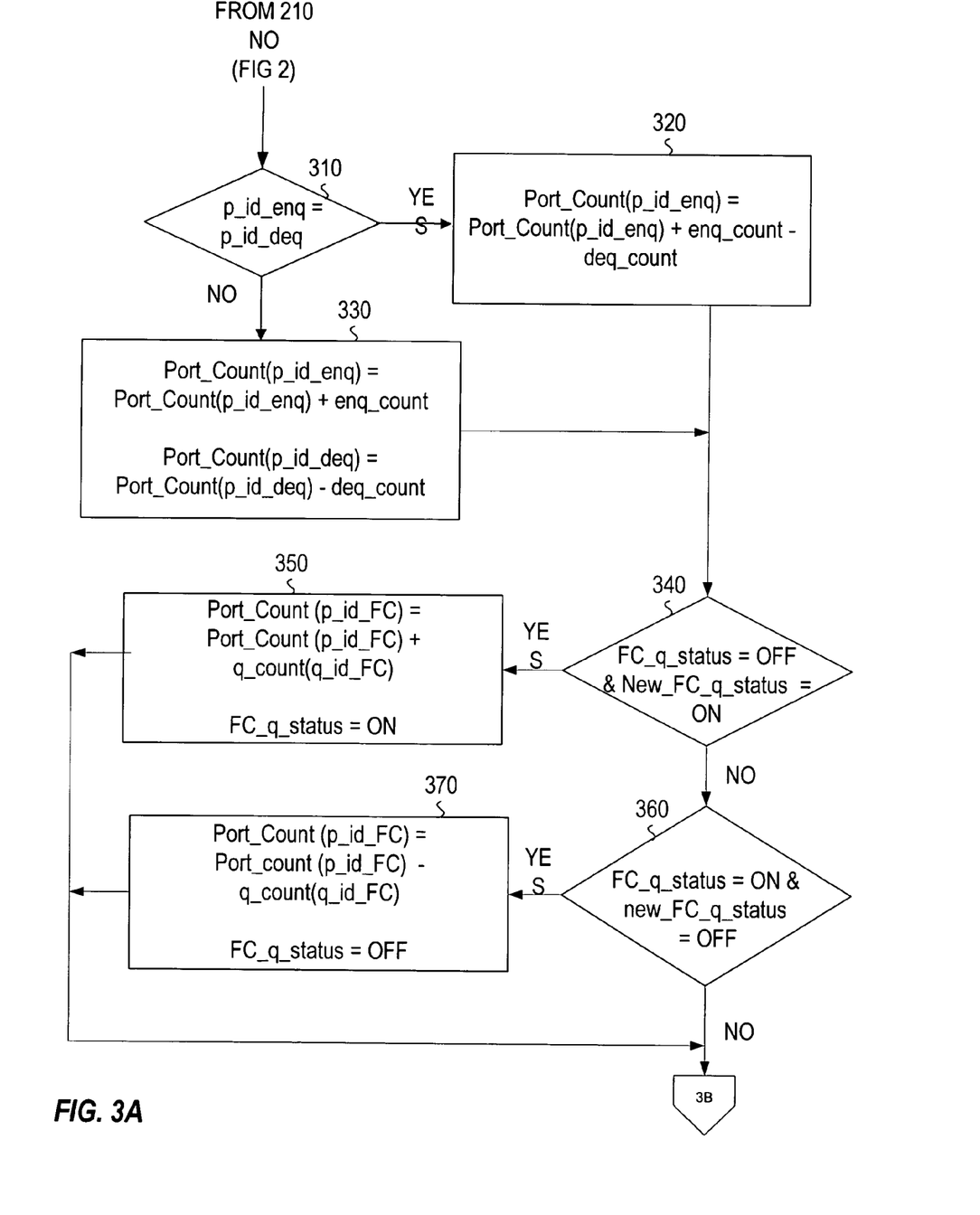
FIG. 3 illustrates an exemplary process flow for updating the associated per-port count and the associated queue count when the queue having a flow control change is not the same as either the queue being queued or the queue being dequeued, according to one embodiment.
Figure 3B:
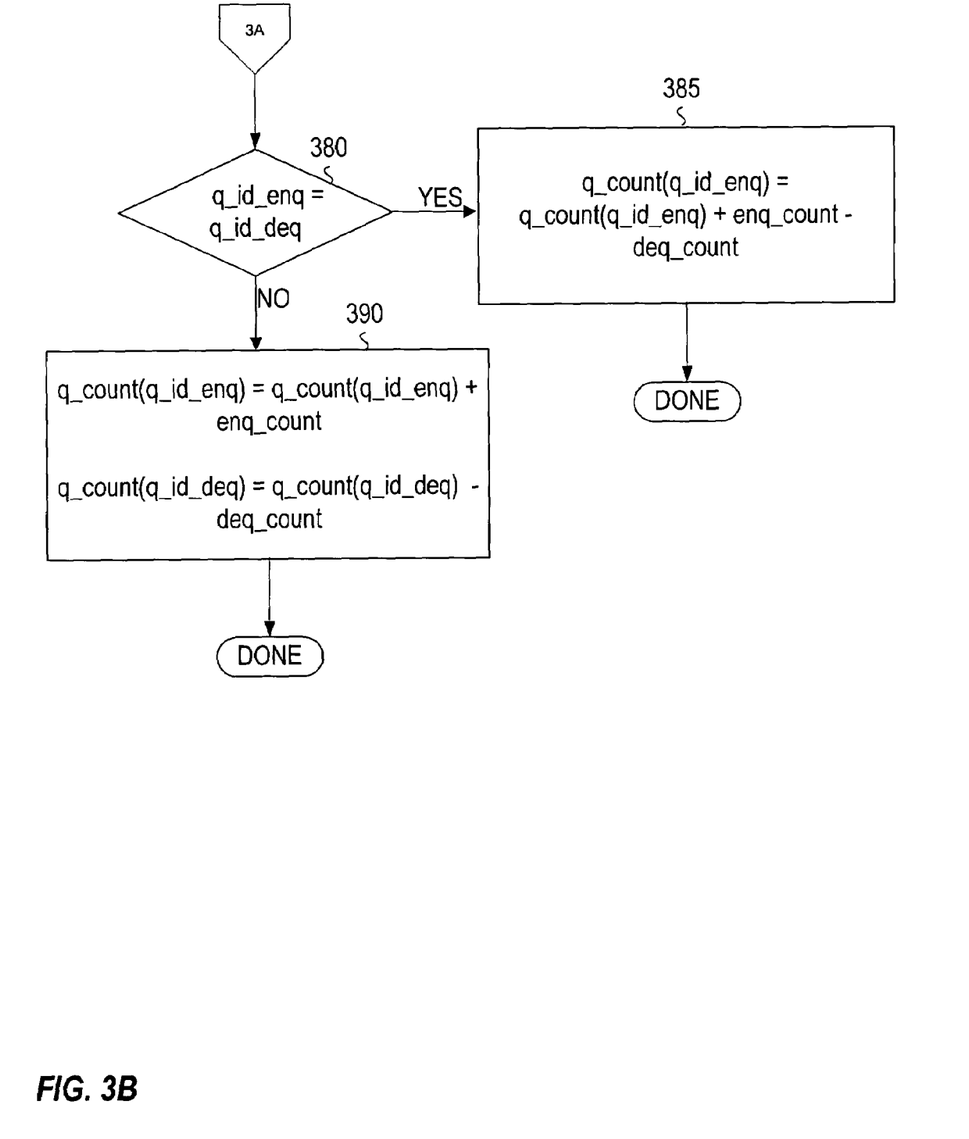

FIG. 3 illustrates an exemplary process flow associated with the queue ID of the FC (q_id_FC) not being the same as the queue ID for either the enqueue (q_id_enq) or the dequeue (q_id_deq). Initially a determination 310 is made as to whether the enqueue port ID (p_id_enq) is the same as the dequeue port ID (p_id_deq). If the port IDs are the same (310 Yes) for the enqueue (p_id_enq) and the dequeue (p_id_deq) then the per-port count for the corresponding destination port (Port_Count(p_id_enq)) is updated 320 to add the amount of data queued (enq_count) and subtract the amount of data dequeued (deq_count). It should be noted that the destination port ID referenced in 320 was the enqueuing port ID (p_id_enq), but that it could also be the dequeuing port ID (p_id_deq)) since they have the same port ID. For ease of understanding we will simply refer to the port ID as the enqueuing port ID (p_id_enq). Referring back to FIG. 1B for an example, if Q1 was enqueued and Q2 was dequeued, the per-port count for egress port 0 would be updated to account for the data queued and the data dequeued as these queues are associated with egress port 0.

If the port IDs are not the same (310 No) for the enqueue (p_id_enq) and dequeue (p_id_deq), then the per-port counts for both the enqueuing (p_id_enq) and the dequeuing (p_id_deq) destination ports are updated 330. The per-port update for the enqueuing destination port (Port_Count (p_id_enq)) includes adding the amount of data queued (enq_count). The per-port update for the dequeuing destination port (Port_Count(p_id_deq)) includes subtracting the amount of data dequeued (deq_count). Referring back to FIG. 1B for an example, if Q1 was enqueued and Q5 was dequeued the per-port count for egress port 0 would be updated to account for the data queued (Q1) while the per-port count for egress port n−1 would be updated to account for the data dequeued (Q5).

Next a determination 340 is made as to whether the flow control status (FC_q_status) changed from OFF (flow-controlled) to ON (not flow-controlled). If the flow control status changed to ON (340 Yes), then the per-port count for destination port having flow control (p_id_FC) is updated 350. The per-port update for the corresponding FC destination port (Port_Count(p_id_FC)) 350 includes adding the queue length of the queue whose flow control state changed (q_count(q_id_FC)) thereto. Also, the flow control status of the queue is marked to be ON (FC_q_status=ON). It should be noted that the port ID for the FC may be separate from any previous update (320, 330) if the associated port ID is different or that it may be in addition to these updates (320, 330) if the port ID is the same as one of these. Referring back to FIG. 1B, if Q0 was enqueued, Q1 was dequeued, and Q2 had a change in flow control status (OFF to ON), then the queue count for the flow control queue (Q2) is added to the per-port count that was calculated in 320.

If the flow control status was ON (340 No), then a determination 360 is made as to whether the flow control status (FC_q_status) changed from ON (not flow-controlled) to OFF (flow-controlled). If the flow control status has changed to OFF (360 Yes), then the per-port count for destination port having flow control (p_id_FC) is updated 370. The per-port update for the corresponding FC destination port (Port_Count(p_id_FC)) 370 includes subtracting the queue length of the queue whose flow control state changed (q_count(q_id_FC)) therefrom. Also, the flow control status of the queue is marked to be OFF (FC_q_status=OFF). It should be noted again that the update of the per-port count 370 may be separate or in addition to the previous per-port updates (320, 330).

If the flow control status was ON (360 No), then no additional update of the per-port count is required. Regardless of the flow control status update to the per-port count (350, 370, 360 No), the queue counts for the affected queues can be determined. Initially a determination 380 is made as to whether the queue IDs are the same for the enqueue (q_id_enq) and dequeue (q_id_deq) queues. If the queue IDs are the same (380 Yes), then the queue count for that queue is updated 385 to add the data queued (enq_count) and subtract the data dequeued (deq_count). It should be noted that the queue ID being updated 385 could be the enqueuing ID (q_id_enq) or the dequeuing ID (q_id_deq) since they have the same queue ID. For ease of understanding and in order to prevent confusion we will refer to the queue ID as the enqueuing ID (q_id_enq).

If the queue IDs are not the same (380 No), the queues are updated 390 separately. The enqueuing queue (q_id_enq) has the data queued (enq_count) added thereto, while the dequeuing queue (q_id_deq) has the data dequeued (deq_count) subtracted therefrom.

The process defined above with respect to FIG. 3 is in no way limited thereto. Rather, the process could be modified in numerous ways (e.g., order, arrangement) without departing from the scope.

Figure 4:
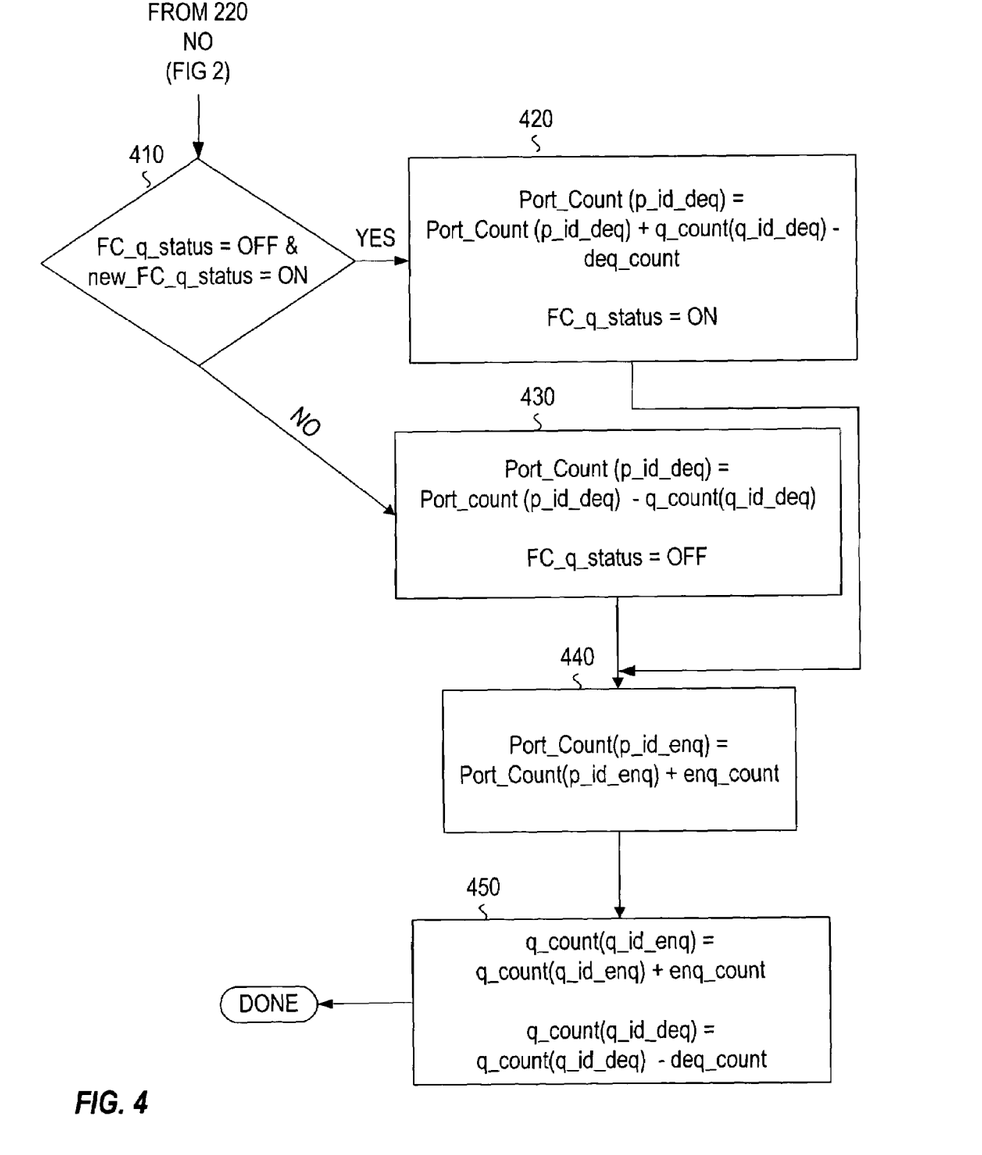
FIG. 4 illustrates an exemplary process flow for updating the associated per-port count and the associated queue count when the queue having a flow control change is the same as the queue being dequeued, according to one embodiment.

FIG. 4 illustrates an exemplary process flow associated with the queue ID of the FC (q_id_FC) being the same as the queue ID of the dequeue (q_id_deq), with the port ID for enqueue (p_id_enq) not being the same as the port id for the dequeue (p_id_deq). It should be noted that if the queue IDs are the same then the port IDs are also the same. Accordingly, when discussing the port ID or queue ID we can refer to them as the dequeuing port ID (p_id_deq) and queue ID (q_id_deq) or the FC port ID (p_id_FC) and queue ID (q_id_FC), or a combination thereof. However, for simplicity and ease of understanding we will refer to the port ID as the dequeuing port ID (p_id_deq) and the queue ID as the dequeuing queue ID (q_id_deq) in FIG. 4.

Initially, a determination 410 is made as to whether the flow control status (FC_q_status) changed from OFF (flow-controlled) to ON (not flow-controlled). If the flow control changed to ON (410 Yes), then the per-port count (Port_Count(p_id_deq)) is updated 420. The per-port count (Port_Count(p_id_deq)) is updated 420 to add the queue length of the queue whose flow control state changed to reflect the fact that the queue is now eligible for servicing (q_count(q_id_deq)) and subtract the amount of data dequeued (deq_count). Also, the flow control status of the queue is marked to be ON (FC_q_status=ON). Referring back to FIG. 1B for an example, if Q1 was dequeued and the flow control was changed from OFF to ON and Q5 was enqueued, the port count for egress port 0 would be updated to subtract the data dequeued and add the data from queue Q1 now eligible for servicing (prior to changes this clock cycle). The process then proceeds to 440 (discussed in detail later).

If the flow control status was ON (410 No), then the flow control status (FC_q_status) changed from ON (not flow-controlled) to OFF (flow-controlled). Accordingly, the per-port count (Port_Count(p_id_deq)) is updated 430. The per-port count (Port_Count(p_id_deq)) is updated 430 to remove the data from the queue that became ineligible for servicing (q_count(q_id_deq)). Also, the flow control status of the queue is marked to be OFF (FC_q_status=OFF). As way of example, consider the example described above with respect to 420 if queue Q1 went from ON to OFF.

The process then updates 440 the per-port count of the destination port associated with the data being enqueued (Port_Count(p_id_enq)) since the enqueuing port ID (p_id_enq) was not the same as the dequeuing port ID (p_id_deq). The Port_Count(p_id_enq) is updated 440 by adding the length of data being queued (enq_count). If the reason for the port ID not matching is that there was no data being queued, then accordingly there is no enqueue port count to update.

It should be noted that the fact that the queue ID of the FC matches the dequeue but not the enqueue means that the queue ID for the enqueue and dequeue are not the same. Accordingly, the queue counts for the queues that were enqueued and dequeued are then updated 450 to reflect the data queued or dequeued, respectively.

The process defined above with respect to FIG. 4 is in no way limited thereto. Rather, the process could be modified in numerous ways (e.g., order, arrangement) without departing from the scope.

FIG. 5 illustrates an exemplary process flow associated with the queue ID of the FC (q_id_FC) being the same as the queue ID for the dequeue queue (q_id_deq), and the port ID for enqueue (p_id_enq) being the same as the port id for the dequeue (p_id_deq). It should be noted that since the port IDs are the same for the enqueue (p_id_enq), dequeue (p_id_deq) and FC (p_id_FC) we could refer to the port ID as any of these. However, for simplicity and ease of understanding we will refer to the port ID as the enqueuing port ID (p_id_enq) in FIG. 5. Moreover, as the queue IDs for the dequeue (q_id_deq) and FC (q_id_FC) are the same we could refer to the queue ID as either of these. However, for simplicity and ease of understanding we will refer to the queue ID as the dequeuing ID (q_id_deq) in FIG. 5.

Initially, a determination 510 is made as to whether the flow control status (FC_q_status) changed from OFF (flow-controlled) to ON (not flow-controlled). If the flow control status changed from OFF to ON (510 Yes), then the per-port count (Port_Count(p_id_enq)) is updated 520. The per-port count (Port_Count(p_id_enq)) is updated 520 to add the queue length of the queue whose flow control state changed to reflect the fact that the queue is now eligible for servicing (q_count(q_id_deq)), add the amount of data queued (enq_count) and subtract the amount of data dequeued (deq_count). Also, the flow control status of the queue is marked to be ON (FC_q_status=ON). Referring back to FIG. 1B for an example, if Q1 was dequeued and the flow control was changed from OFF to ON and Q2 was enqueued, the port count for egress port 0 would be updated to add the data queued to Q2, add the data from queue Q1 (prior to changes this clock cycle), and remove the data dequeued from Q1.

If the flow control status was ON (510 No), then the flow control status (FC_q_status) changed from ON (not flow-controlled) to OFF (flow-controlled). Accordingly, the per-port count (Port_Count(p_id_enq)) is updated 530. The per-port count (Port_Count(p_id_enq)) is updated 530 to subtract the queue length of the flow control queue (q_count (q_id_deq)) to reflect its ineligibility for being scheduled and add the amount of data queued (enq_count). Also, the flow control status of the queue is marked to be OFF (FC_q_status=OFF). As way of example, consider the example described above with respect to 520 if queue Q1 went from ON to OFF.

It should be noted that the fact that the queue ID of the FC matches the dequeue but not the enqueue means that the queue ID for the enqueue and dequeue are not the same. Accordingly, the queue counts for the queues that were enqueued and dequeued are then updated 540 to reflect the data queued or dequeued, respectively.

The process defined above with respect to FIG. 5 is in no way limited thereto. Rather, the process could be modified in numerous ways (e.g., order, arrangement) without departing from the scope.

Figure 6:
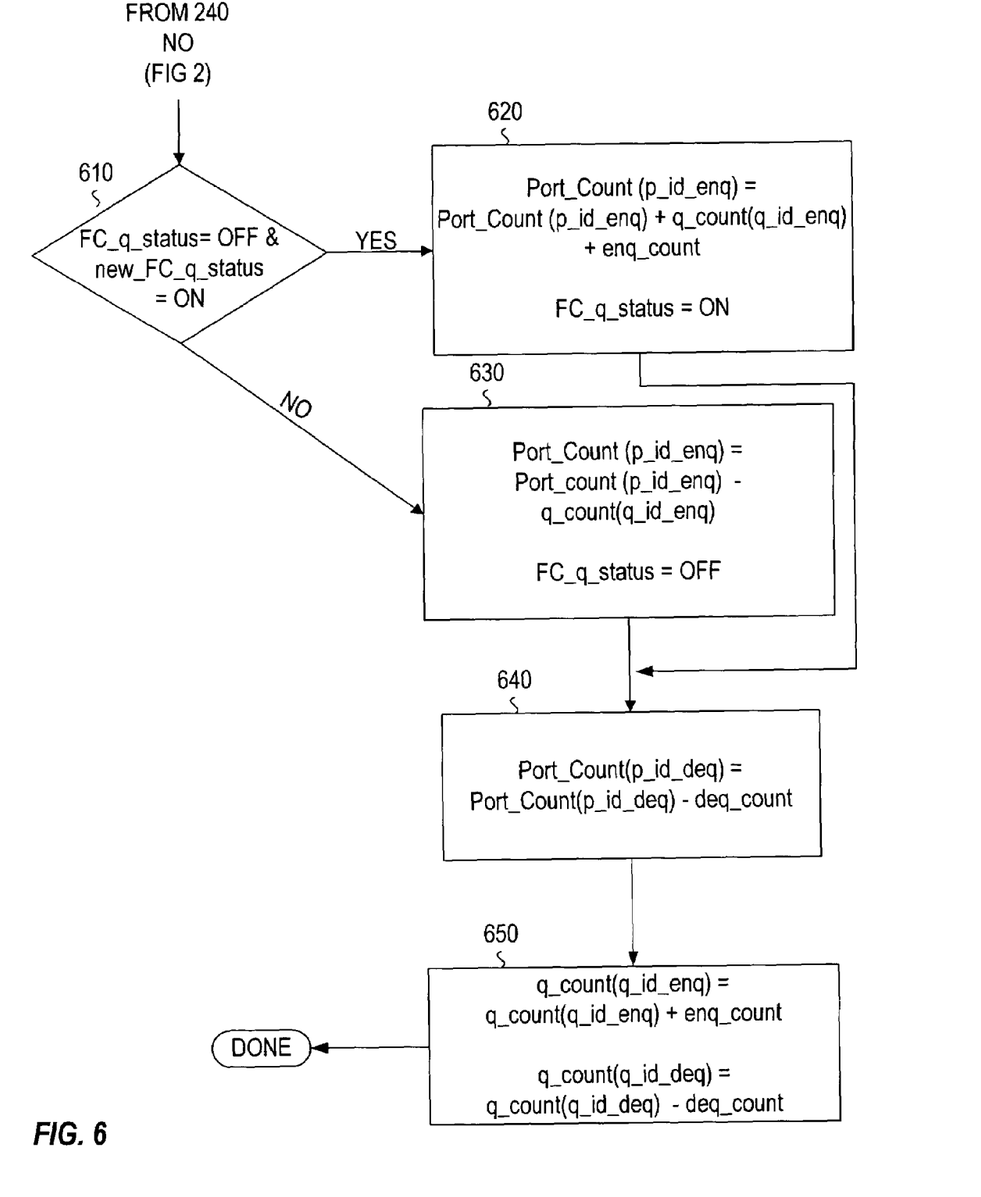
FIG. 6 illustrates an exemplary process flow for updating the associated per-port count and the associated queue count when the queue having a flow control change is the same as the queue being queued, according to one embodiment.

FIG. 6 illustrates an exemplary process flow associated with the queue ID of the FC (q_id_FC) being the same as the queue ID for the enqueue (q_id_enq), with the port ID for enqueue (p_id_enq) not being the same as the port id for the dequeue (p_id_deq). It should be noted that if the queue IDs are the same then the port IDs are also the same. Accordingly, when discussing the port ID or queue ID we can refer to them as the enqueuing port ID (p_id_enq) and enqueuing queue ID (q_id_enq) or the FC port ID (p_id_FC) and FC queue ID (q_id_FC), or a combination thereof. However, for simplicity and ease of understanding we will refer to the port ID as the enqueuing port ID (p_id_enq) and the queue ID as the enqueuing queue ID (q_id_enq) in FIG. 6.

Initially, a determination 610 is made as to whether the flow control status (FC_q_status) changed from OFF (flow-controlled) to ON (not flow-controlled). If the flow control status changed from OFF to ON (610 Yes), then the per-port count (Port_Count(p_id_enq)) is updated 620. The per-port count (Port_Count(p_id_enq)) is updated 620 to add the queue length of the queue whose flow control state changed to reflect the fact that the queue is now eligible for servicing (q_count(q_id_enq)) and add the amount of data queued (enq_count). Also, the flow control status of the queue is marked to be ON (FC_q_status=ON). Referring back to FIG. 1B for an example, if Q1 was enqueued and the flow control was changed from OFF to ON, and Q5 was dequeued, the port count for egress port 0 would be updated to add the data queued and add the data from queue Q1 now eligible for servicing (prior to changes this clock cycle). The process then proceeds to 640 (discussed in detail later).

If the flow control status was previously ON (610 No), then the flow control status (FC_q_status) changed from ON (not flow-controlled) to OFF (flow-controlled). Accordingly, the per-port count (Port_Count(p_id_enq)) is updated 630. The per-port count (Port_Count(p_id_enq)) is updated 630 to remove the data from the queue that became ineligible for servicing (q_count(q_id_enq)). Also, the flow control status of the queue is marked to be OFF (FC_q_status=OFF). As way of example, consider the example described above with respect to 620 if queue Q1 went from ON to OFF.

The process then updates 640 the per-port count of the destination port associated with the data being dequeued (Port_Count(p_id_deq)) since the dequeuing port ID (p_id_deq) was not the same as the enqueuing port ID (p_id_enq). The Port_Count(p_id_deq) is updated 640 by subtracting the length of data being dequeued (deq_count). If the reason for the port ID not matching is that there was no data being dequeued, then accordingly there is no dequeue port count to update.

It should be noted that the fact that the queue ID of the FC matches the enqueue but not the dequeue means that the queue ID for the enqueue and dequeue are not the same. Accordingly, the queue counts for the queues that were enqueued and dequeued are then updated 650 to reflect the data queued or dequeued, respectively.

The process defined above with respect to FIG. 6 is in no way limited thereto. Rather, the process could be modified in numerous ways (e.g., order, arrangement) without departing from the scope.

FIG. 7 illustrates an exemplary process flow associated with the queue ID of the FC (q_id_FC) being the same as the queue ID for the enqueue (q_id_enq), and the port ID for enqueue (p_id_enq) being the same as the port id for the dequeue (p_id_deq). It should be noted that since the port IDs are the same for the enqueue (p_id_enq), dequeue (p_id_deq) and FC (p_id_FC) we could refer to the port ID as any of these. However, for simplicity and ease of understanding we will refer to the port ID as the enqueuing port ID (p_id_enq) in FIG. 7. Moreover, as the queue IDs are the same for the enqueue (q_id_enq) and FC (q_id_FC) we could refer to the queue ID as either of these. However, for simplicity and ease of understanding we will refer to the queue ID as the enqueuing queue ID (q_id_enq) in FIG. 7.

Initially, a determination 710 is made as to whether the flow control status (FC_q_status) changed from OFF (flow-controlled) to ON (not flow-controlled). If the flow control changed from OFF to ON (710 Yes), then the per-port count (Port_Count(p_id_enq)) is updated 720. The per-port count (Port_Count(p_id_enq)) is updated 720 to add the queue length of the queue whose flow control state changed to reflect the fact that the queue is now eligible for servicing (q_count(q_id_enq)), add the amount of data queued (enq_count) and subtract the amount of data dequeued (deq_count). Also, the flow control status of the queue is marked to be ON (FC_q_status=ON). Referring back to FIG. 1B for an example, if Q1 was enqueued and the flow control was changed from OFF to ON, and Q2 was dequeued, the per-port count for egress port 0 would be updated to remove the data dequeued from Q2, add the data from queue Q1 (prior to changes this clock cycle), and add the data queued to Q1.

If the flow control was previously ON (710 No), then the flow control status (FC_q_status) changed from ON (not flow-controlled) to OFF (flow-controlled). Accordingly, the per-port count (Port_Count(p_id_enq)) is updated 730. The per-port count (Port_Count(p_id_enq)) is updated 730 to subtract the queue length of the flow control queue (q_count (q_id_deq)) to reflect its ineligibility for being scheduled and add the amount of data queued (enq_count). Also, the flow control status of the queue is marked to be OFF (FC_q_status=OFF). As way of example, consider the example described above with respect to 520 if queue Q1 went from ON to OFF.

It should be noted that the fact that the queue ID of the FC matches the dequeue but not the enqueue means that the queue ID for the enqueue and dequeue are not the same. Accordingly, the queue counts for the queues that were enqueued and dequeued are then updated 540 to reflect the data queued or dequeued, respectively.

The process defined above with respect to FIG. 7 is in no way limited thereto. Rather, the process could be modified in numerous ways (e.g., order, arrangement) without departing from the scope.

FIG. 8 illustrates an exemplary process flow associated with the queue ID of the FC (q_id_FC) being the same as the queue ID for the enqueuing (q_id_enq) and the dequeuing (q_id_deq). It should be noted that since the queue IDs are the same that the port IDs will also be the same. Accordingly, the queue ID and the port ID could be referred to by FC (q_id_FC and p_id_FC), enqueuing (q_id_enq and p_id_enq), or dequeuing (q_id_deq and p_id_deq). For ease of understanding we will simply refer to queue and port IDs as the enqueuing queue and port IDs (q_id_enq and p_id_enq) in FIG. 8.

Initially, a determination 810 is made as to whether the flow control status (FC_q_status) changed from OFF (flow-controlled) to ON (not flow-controlled). If the flow control status changed from OFF to ON (810 Yes), then the per-port count (Port_Count(p_id_enq)) is updated 820. The update 820 of the per-port count (Port_Count(p_id_enq)) includes adding the previous queue length of the queue in which a FC transition occurs (q_count(q_id_enq)) to reflect its eligibility for being scheduled, adding the amount of data being queued (enq_count) and subtracting the amount of data being dequeued (deq_count). Also, the flow control status of the queue is marked to be ON (FC_q_status=ON). Referring back to FIG. 1B for an example, if Q1 was queued and dequeued and the flow control was changed from OFF to ON, the port count for egress port 0 would be updated to add the data from queue Q1 (prior to changes this clock cycle), add the data queued to Q1, and remove the date dequeued from Q1.

If the flow control status was previously ON (810 No), then the flow control status (FC_q_status) changed from ON (not flow-controlled) to OFF (flow-controlled). Accordingly, the per-port count (Port_Count(p_id_enq)) is updated 830. The update 830 of the per-port count (Port_Count (p_id_enq)) includes subtracting the previous queue length of the queue in which a FC transition occurs (q_count (q_id_enq)) to reflect its ineligibility for being scheduled. Also, the flow control status of the queue is marked to be OFF (FC_q_status=OFF).

The update of the queue count (q_count(q_id_enq)) 840 includes adding the amount of data being queued (enq_count) and subtracting the amount of data being dequeued (deq_count).

The process defined above with respect to FIG. 8 is in no way limited thereto. Rather, the process could be modified in numerous ways (e.g., order, arrangement) without departing from the scope.

The process flows described above in FIGS. 3–8 for maintaining a per-egress port count can be implemented by a processor on the interface cards. The processors may be implemented as hardware, software, or a combination thereof. The processors may be stand alone components on the interface cards or may be implemented in a processor performing other operations. The processor on the interface cards will track, for ingress ports contained thereon, an aggregate per-egress port count. In addition, the store-and-forward device may have a processor that maintains an aggregate per-egress port count for the entire store and forward device. The store-and-forward processor may be implemented as hardware, software, or a combination thereof and may be a stand alone component or may be implement in a processor performing other operations. A controller in the store-and-forward device can use the aggregate counts to select the next queue to process. The controller and processor may be individual components or may be one in the same.

Although the various embodiments have been illustrated by reference to specific embodiments, it will be apparent that various changes and modifications may be made. Reference to "one embodiment" or "an embodiment" means that a particular feature, structure or characteristic described in connection with the embodiment is included in at least one embodiment. Thus, the appearances of the phrase "in one embodiment" appearing in various places throughout the specification are not necessarily all referring to the same embodiment.

Different implementations may feature different combinations of hardware, firmware, and/or software. For example, some implementations feature computer program products disposed on computer readable mediums. The programs include instructions for causing processors to perform techniques described above.

The various embodiments are intended to be protected broadly within the spirit and scope of the appended claims.

The invention claimed is:

1. An apparatus, comprising:
   at least one ingress port to receive packets from external sources;
   a plurality of egress ports to receive the packets from the at least one ingress port and forward the packets to external destinations; and
   a processor to maintain continuous aggregate per egress port counts for the at least one ingress port;
   wherein the packets have an associated flow based on at least a source and destination of the packets and the flow of the packets is controllable, wherein the packets are stored in flow controllable queues while awaiting forwarding from the at least one ingress port and the packets are stored in the flow controllable queues based on the associated flow of the packets rather than egress ports associated with the packets; and
   wherein the aggregate per egress port count for an egress port includes packets having a flow that is associated with the egress port and is eligible for forwarding, wherein the aggregate per egress port count for each egress port is updated to account for changes to the flow controllable queues associated therewith as the changes occur rather than summing a count for each flow controllable queue associated therewith.

2. The apparatus of claim 1, wherein the continuous aggregate per egress port counts are at least one factor used to determine a next queue to transmit data from.

3. The apparatus of claim 1, wherein each egress port has a plurality of flow controllable queues associated therewith.

4. The apparatus of claim 1, wherein a packet is associated with an egress port if the packet will be handled by the egress port as part of the flow.

5. The apparatus of claim 1, wherein a packet is eligible for forwarding if the associated flow is enabled.

6. The apparatus of claim 1, wherein the processor updates the aggregate per egress port count for a specific egress port to add a packet queued to a flow controllable queue associated with the specific egress port.

7. The apparatus of claim 1, wherein the processor updates the aggregate per egress port count for a specific egress port to subtract a packet dequeued from a flow controllable queue associated with the specific egress port.

8. The apparatus of claim 1, wherein the processor updates the aggregate per egress port count for a specific egress port to remove packets within a flow controllable queue associated with the specific egress port when flow associated with the flow controllable queue switches to disabled.

9. The apparatus of claim 1, wherein the processor updates the aggregate per egress port count for a specific egress port to add packets within a flow controllable queue associated with the specific egress port when flow associated with the flow controllable queue switches to enabled.

10. The apparatus of claim 1, wherein the processor updates the aggregate per egress port counts and the flow controllable queue counts coherently.

11. The apparatus of claim 1, wherein the processor updates the aggregate per egress port counts each clock cycle to account for changes during the clock cycle.

12. The apparatus of claim 11, wherein the processor updates the aggregate per egress port count based on packets being queued to or dequeued from associated flow controllable queues and associated flow controllable queues having a change in flow status.

13. The apparatus of claim 11, wherein the processor updates the aggregate per egress port count for a specific egress port by adding a packet queued in a first flow controllable queue associated with the specific egress port and subtracting a packet dequeued from a second flow controllable queue associated with the specific egress port.

14. The apparatus of claim 11, wherein the processor updates the aggregate per egress port count for a specific egress port by adding a packet queued in a first flow controllable queue associated with the specific egress port, and adding packets contained within a second flow controllable queue associated with the specific egress port when flow associated with the second flow controllable queue switches to enabled.

15. The apparatus of claim 11, wherein the processor updates the aggregate per egress port count for a specific egress port by adding a packet queued in a first flow controllable queue associated with the specific egress port, and subtracting packets contained within a second flow controllable queue associated with the specific egress port when flow associated with the second flow controllable queue switches to disabled.

16. The apparatus of claim 11, wherein the processor updates the aggregate per egress port count for a specific egress port by subtracting a packet dequeued in a first flow controllable queue associated with the specific egress port, and adding packets contained within a second flow controllable queue associated with the specific egress port when flow associated with the second flow controllable queue switches to enabled.

17. The apparatus of claim 11, wherein the processor updates the aggregate per egress port count for a specific egress port by subtracting a packet dequeued in a first flow controllable queue associated with the specific egress port, and subtracting packets contained within a second flow controllable queue associated with the specific egress port when flow associated with the second flow controllable queue switches to disabled.

18. The apparatus of claim 11, wherein the processor updates the aggregate per egress port count for a specific egress port by adding a packet queued in a first flow controllable queue associated with the specific egress port, subtracting a packet dequeued from a second flow controllable queue associated with the specific egress port, and adding packets contained within a third flow controllable queue associated with the specific egress port when flow associated with the third flow controllable queue switches to enabled.

19. The apparatus of claim 11, wherein the processor updates the aggregate per egress port count for a specific egress port by adding a packet queued in a first flow controllable queue associated with the specific egress port, subtracting a packet dequeued from a second flow controllable queue associated with the specific egress port, and subtracting packets contained within a third flow controllable queue associated with the specific egress port when flow associated with the third flow controllable queue switches to disabled.

20. The apparatus of claim 19, wherein if the third flow controllable queue is same as the first flow controllable queue, the second flow controllable queue or both the aggregate per egress port count for the specific egress port need not add a packet queued, subtract a packet dequeued, or add a packet queued and subtract a packet dequeued respectively.

21. A method, comprising:
receiving packets from external sources at an ingress port, wherein the packets have an associated flow based on at least a source and destination of the packets and the flow of the packets is controllable;
storing the packets in flow controllable queues based on the associated flow of the packets rather than an egress port associated with the packets;
maintaining a continuous aggregate per egress port count for the ingress port, wherein the aggregate per egress port count for an egress port includes packets having a flow that is associated with the egress port and is eligible for forwarding, wherein the aggregate per egress port count for the egress port is updated to account for changes to the flow controllable queues associated therewith as the changes occur rather than summing a count for each flow controllable queue associated therewith;
selecting a queue to forward packets from based at least in part on the aggregate per egress port count; and
forwarding a packet from the selected queue to an appropriate egress port.

22. The method of claim 21, wherein each egress port has a plurality of flow controllable queues associated therewith, and wherein a packet is associated with an egress port if the packet will be handled by the egress port as part of the flow.

23. The method of claim 21, wherein a packet is eligible for forwarding if the associated flow is enabled.

24. The method of claim 21, wherein said maintaining includes updating the aggregate per egress port count each clock cycle to account for changes during the clock cycle.

25. The method of claim 24, wherein said maintaining includes updating the aggregate per egress port count based on packets being queued to or dequeued from associated flow controllable queues and associated flow controllable queues having a change in flow status.

26. The method of claim 21, wherein maintaining includes updating the aggregate per egress port counts and flow controllable queue counts coherently.

27. A store and forward device comprising:
a plurality of high-speed LAN protocol cards to receive, store, and transmit packets, wherein the plurality of high-speed LAN protocol cards include a plurality of ingress ports, a plurality of egress ports, and a plurality of queues; wherein the packets have an associated flow based on at least a source and destination of the packets and the flow of the packets is controllable, wherein the packets are stored in flow controllable queues while awaiting forwarding from the ingress ports, and wherein the packets are stored in the flow controllable queues based on the associated flow of the packets rather than egress ports associated with the packets;
a processor to maintain continuous aggregate per egress port counts for the ingress ports, wherein the aggregate per egress port count for an egress port includes packets having a flow that is associated with the egress port and is eligible for forwarding, wherein the aggregate per egress port count for the egress port is updated to account for changes to the flow controllable queues associated therewith as the changes occur rather than summing a count for each flow controllable queue associated therewith;
a backplane to connect the plurality of high-speed LAN protocol cards together; and
a scheduler to determine a next queue to service based at least in part on the aggregate per egress port counts.

28. The device of claim 27, wherein the processor updates the aggregate per egress port counts and the flow controllable queue counts coherently.

29. The device of claim 27, wherein the processor updates the aggregate per egress port counts each clock cycle to account for changes during the clock cycle.

30. The device of claim 27, wherein the processor updates the aggregate per egress port count based on packets being queued to or dequeued from associated flow controllable queues and associated flow controllable queues having a change in flow status.

31. An apparatus, comprising:
a plurality of flow controllable queues to store packets therein while awaiting forwarding; and
a processor to maintain continuous aggregate per egress port counts for the plurality of flow controllable queues;
wherein the packets have an associated flow that is controllable, and wherein the packets are stored in the flow controllable queues based on the associated flow of the packets rather than egress ports associated with the packets; and
wherein the aggregate per egress port count for an egress port is updated to account for changes to the flow controllable queues associated therewith as the changes occur rather than summing a count for each flow controllable queue associated therewith.

32. The apparatus of claim 31, wherein the aggregate per egress port count for an egress port includes packets having a flow that is associated with the egress port and is eligible for forwarding.

33. The apparatus of claim 31, wherein the processor updates the aggregate per egress port counts each clock cycle to account for changes during the clock cycle.

34. The apparatus of claim 31, wherein the processor updates the aggregate per egress port count based on packets being queued to or dequeued from associated flow controllable queues and associated flow controllable queues having a change in flow status.

* * * * *